Nov. 15, 1960 R. L. McINTYRE 2,960,567

MEANS AND METHOD OF TELEVISION PROGRAM RECORDING

Filed Dec. 16, 1957 3 Sheets-Sheet 1

ROY L. MC INTYRE
*INVENTOR.*

BY Loyal H. McCarthy

ATTORNEY.

Nov. 15, 1960 R. L. McINTYRE 2,960,567

MEANS AND METHOD OF TELEVISION PROGRAM RECORDING

Filed Dec. 16, 1957 3 Sheets-Sheet 2

ROY L. MC INTYRE
*INVENTOR.*

BY Loyal H. McCarthy

ATTORNEY.

ROY L. MC INTYRE
*INVENTOR.*
BY Loyal H. McCarthy
ATTORNEY.

United States Patent Office 2,960,567 Patented Nov. 15, 1960

2,960,567

MEANS AND METHOD OF TELEVISION PROGRAM RECORDING

Roy L. McIntyre, Portland, Oreg.
(17520 SW. Redfern, Lake Grove, Oreg.)

Filed Dec. 16, 1957, Ser. No. 703,098

8 Claims. (Cl. 178—6.6)

My invention relates to recording television programs on tape, or the equivalent, by any satisfactory method, including electromagnetic or embossing, for broadcast at different times or places.

One object of my invention is to provide a means and method for accurately recording all phases of a television broadcast which will be accurate, convenient and relatively simple.

Another object of my invention is to provide a means and method of recording all phases of a television program that will result in a relatively small recorded package for convenient handling.

A further object of my invention is to provide a means and method of accurately recording all phases of a television program on a tape by any known, satisfactory process, including embossing or electromagnetic.

A still further object of my invention is to record all phases of a television program on a tape through the use of synchronized multiple recording tubes and synchronized multiple recording heads.

Still another object of my invention is to provide a means and method of recording television programs that also may serve as its own monitor as well as for recording broadcasts.

Other and further objects of my invention will be apparent from the drawings, specification and claims as herein set forth.

Referring to the drawings.

Figure 1:
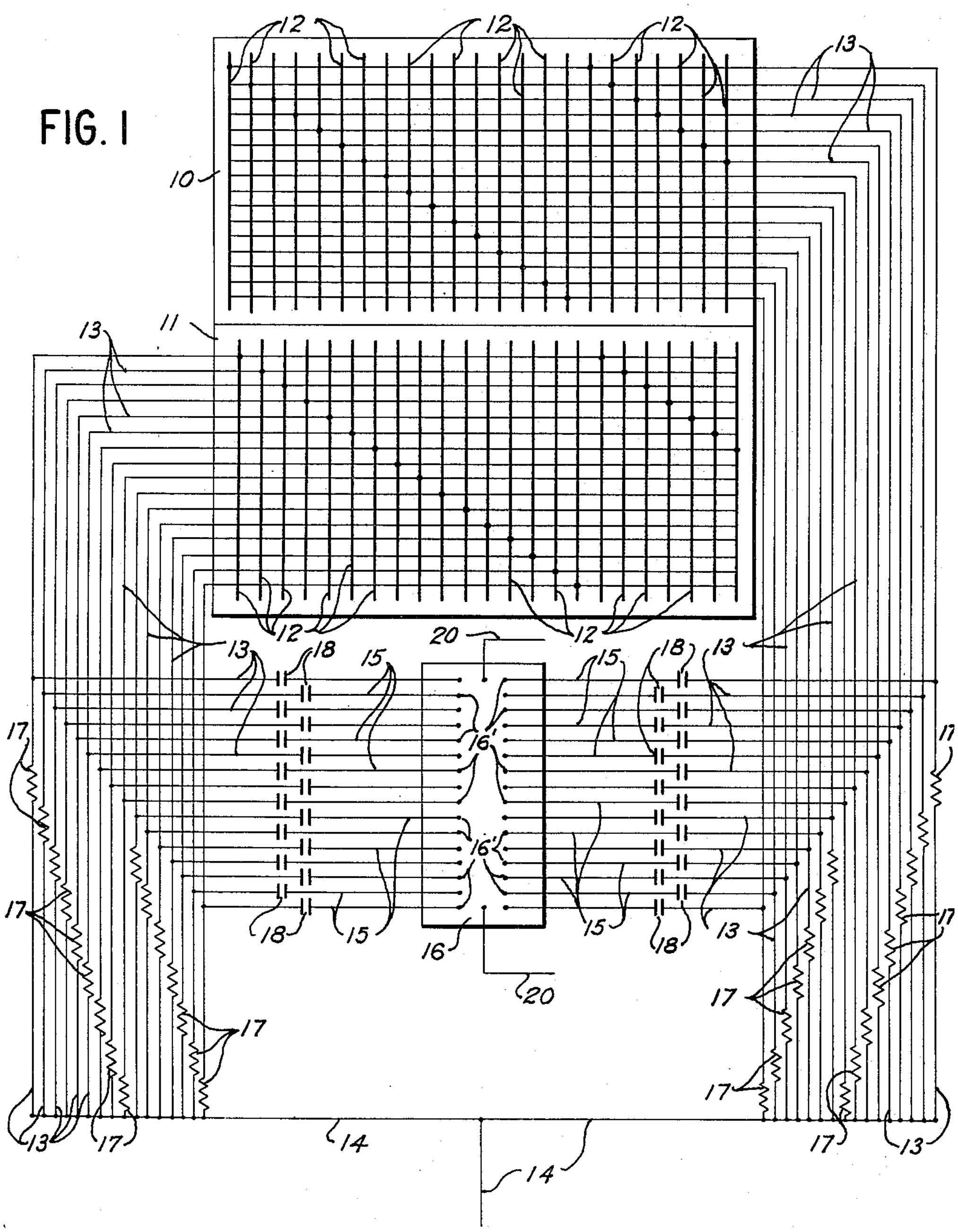
Fig. 1 is a diagrammatical wiring view showing the multiple recording vacuum tubes, recording detector plates, conductors, the inter-connection of each sixteenth recording detector plate by a conductor, the load resistors, the coupling condensers, the junction box to the recording head and the source of supply conductor.
Figure 2:
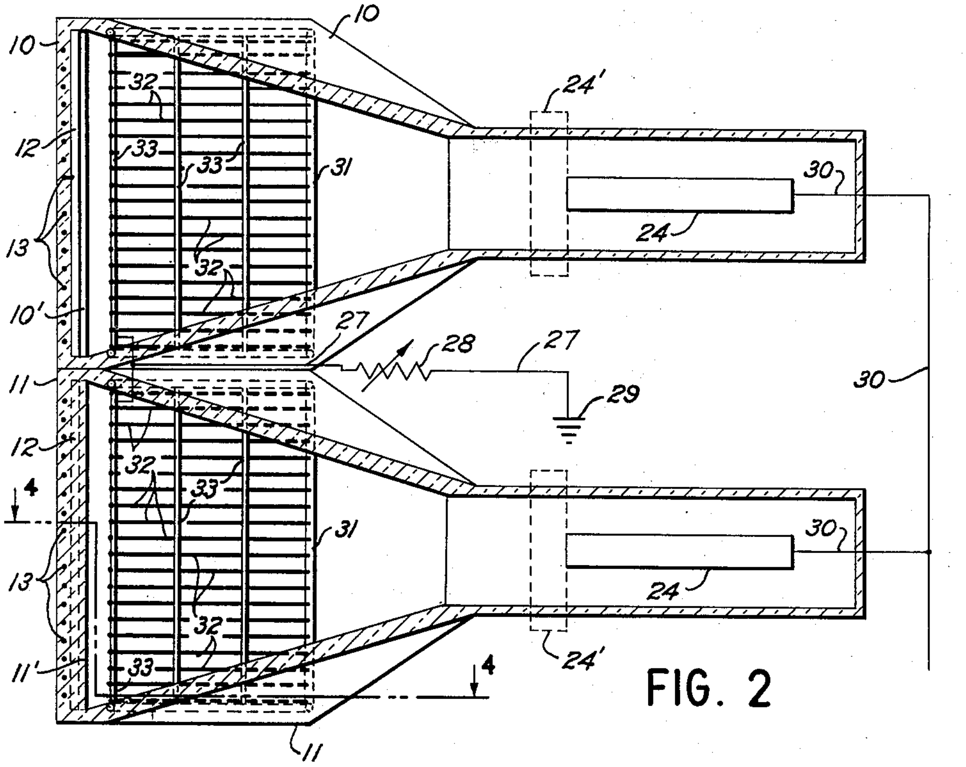
Fig. 2 is a side elevational view in section showing the plurality of recording vacuum tubes, the conventional electron gun in each tube synchronizedly connected to the same source of information supply, the alternate positioning of the recording plates in the face of said tubes, the suppressor grids connected together and the variable resistor between the suppressor grids and ground.
Figure 3:
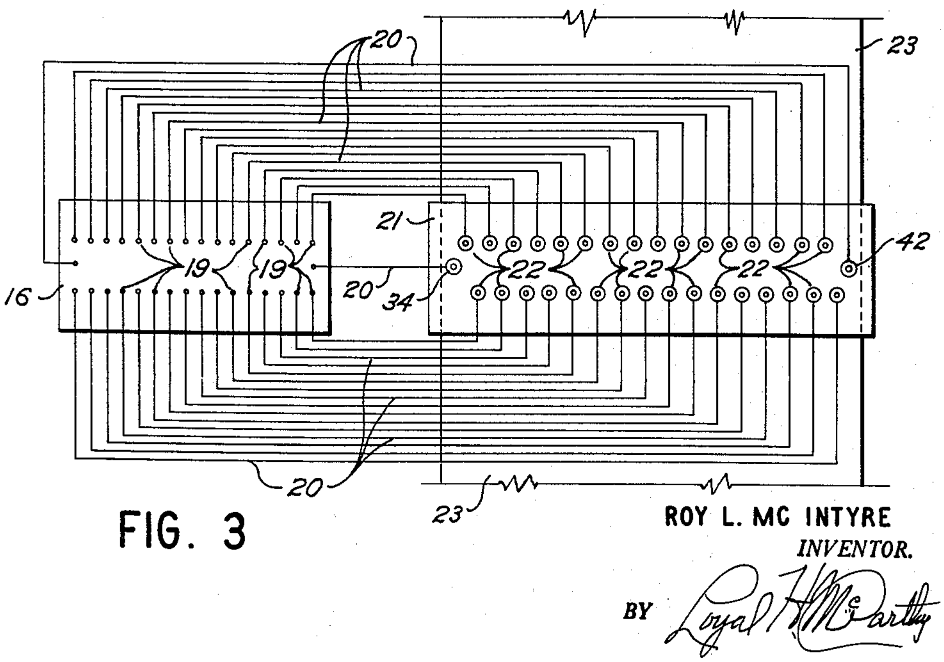
Fig. 3 is a diagrammatical wiring view showing the wiring from the junction box to the recording head and showing a fragment of a recording tape used therewith.
Figure 4:
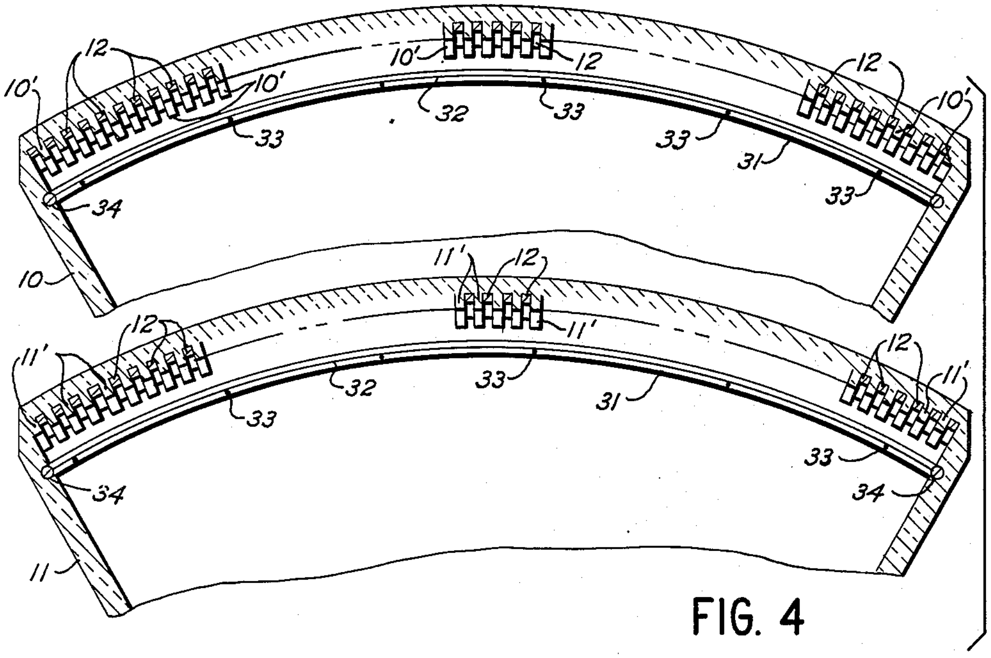

Fig. 4 is a fragmentary sectional plan view of the multiple vacuum recording tubes on an enlarged scale in the direction of the arrows along line 4—4 of Fig. 2, showing the positioning of the recording detector plates and insulators in each tube relative to each other and also showing the suppressor grids in position. The plurality of tubes in this view have been moved out of vertical alignment for purposes of clarity.

Figure 5:
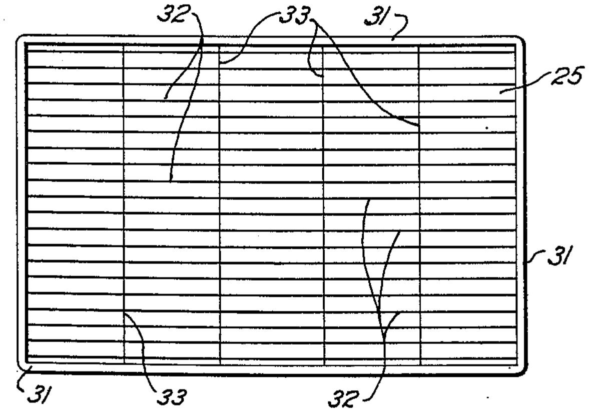

Fig. 5 is a detail front elevation view of an enlarged scale of a typical suppressor grid.

Figure 6:
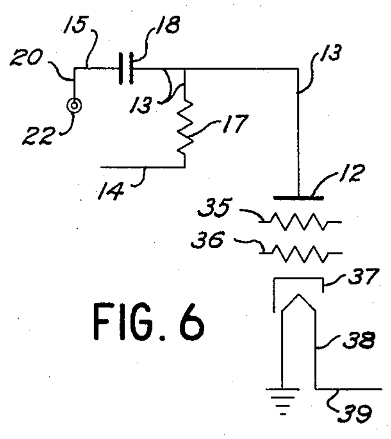

Fig. 6 is a schematic view of a typical recording tube depicting the method and means of feeding video information through such a tube to a typical recording head.

Figure 7:
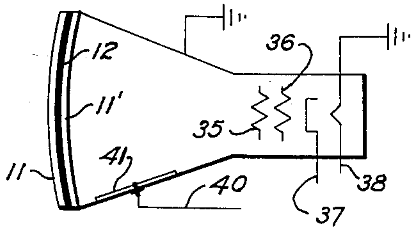

Fig. 7 is a schematic view of a standard type tube employing the high voltage lead and aquadag principle, adapted to embody my invention and showing the recording detector plates and insulators.

Referring further to the drawings:

There are two recording picture tube elements, the upper one 10 and the lower one 11 being identical in size, shape and structure with the exception that each of the detector plates 12 of the tube 10 is positioned directly above an insulator 11' of the tube 11 while each detector plate 12 of the tube 11 is positioned exactly and directly below an insulator 10' of the tube 10. The detector plates 12 are formed of any suitable metal, such as nickel alloy, or electricity conducting material. The tubes 10 and 11 are provided on the inner surfaces of their faces with glass insulators which are integral parts of the tube. The insulators 10' of the tube 10 and 11' of the tube 11 are exactly the same width as the detector plates 12 alternately spaced along the face of each tube. The insulators 10' and 11' and the detector plates 12 extend from top to bottom of the picture portion of each respective tube. A plurality of conductors 13, each connecting a given multiple of the series of detector plates 12 together, are provided. The conductors 13, in the disclosure herein, are preferably embedded medially of the thickness of the face of the tube with contacts connecting the particular detector plate 12 of the given multiple of detector plates to its respective conductor 13. Otherwise, the tubes 10 and 11, aside from relative face dimensions, are of standard construction forms now known in the art.

In recording tubes 10 and 11 one form will be an all glass tube with a potential D.C. voltage of approximately 10,000 volts applied directly and simultaneously to all detector plates 12 through the conductors 13 and the plate load resistors 17 between the plates 12 and the common high voltage source of supply 14. As the electron beam strikes any given plate a voltage drop is created across the particular load resistor 17 in its particular conductor lead 13 to the common high voltage source of supply 14. This voltage drop is reflected via the particular intersecting conductor 15, between the load resistor 17 and the detector plate 12, through the condenser 18 in the intersecting conductor 15, the junction box 16 and conductor 20 to the recording head 22 which imposes the pattern for said voltage drop on the recording tape 23. The same sequence of events occurs successively in each of the detector plates 12 as they are swept by the electron beam, and the appropriate pattern reflected through the respective recording head 22 of each is traced on the tape 23.

In the embodiments set forth herein as an example of my invention the faces of the tubes are each three inches high and fifteen inches wide inside, and the detector plates and insulators are each $\frac{1}{16}$ of an inch wide. The face surfaces of the tubes are both curved horizontally and may be curved vertically to compensate for the arcuate sweep of the electron beam. The curvatures of the faces of the tubes are on a true arc determined by the distance from the electron beam-emitting portion of the electron guns 24 to the detector plates 12, which distance is the radius of the curvature of each of the tubes in both the horizontal and vertical directions. When vertical curvature is not incorporated, the faces of the tubes are flat vertically, and the electron beam sweeps along one horizontal path only. These arrangements result in the electron beams always traveling the same distance to the face of the tube regardless of the position at which the beam may be located at any time on the face of the tube.

The tubes are exhausted to as near a perfect vacuum as is possible and are also each equipped with standard electron guns 24 within the neck thereof. Conventional or standard horizontal and vertical deflection elements 24′ are conventionally positioned at the necks of each of the tubes 10 and 11 to control the horizontal and vertical sweep of the beam from the electron guns 24. The electron guns 24 are synchronizedly connected in parallel by means of a lead 30 from the receiver or amplifier portion of my device. A suppressor grid 25 is positioned within the picture tubes back of the rearmost edges of the glass insulators 10′ and 11′ in uniformly spaced relation thereto. The horizontal and vertical shapes of the grid 25 are conformed to those of the recording tube faces. The grids 25 are synchronizedly connected in parallel by means of a conductor 27 through a variable resistor 28 to the ground 29 or to a negative D.C. voltage supply if necessary. The grid 25 ordinarily operates at the same voltage as the cathode 37 if the recording tube has the video information applied to the control grid 36. If the video information is applied to the cathode 37, the suppressor grid 25 would operate at the same voltage as the control grid 36. The purpose of grid 25 is to prevent the accumulation of an electron space charge within the recording tubes which would cause operational failure.

The suppressor grid 25 is positioned a predetermined distance back of the insulators 10′ or 11′, as the case may be, and may consist of a relatively rigid peripheral frame 31 supporting a plurality of horizontal wires 32 which are spaced approximately ⅛ of an inch apart. Vertical wires 33 may also be necessary to retain the desired shape and contour of the horizontal wires 32. In the event of employing vertical support wires 33 they will be so positioned in each suppressor grid 25 as to fall directly behind an insulator 10′ or 11′, as the case may be, in each tube 10 or 11. The grid is retained in the inner walls of the tubes 10 and 11 by any suitable means such as grooves 34 in the side, top and bottom walls of the tube adapted to retain the grid in position. The inner surfaces of the insulators 10′ and 11′ of each tube are coated with any suitable fluorescing substance, so that the tubes may act as monitors as well as recording pick-up media. Each tube may have complete picture information cast upon it by the synchronized connection of their respective electron guns to a common lead from a receiver or amplifier or may have only a single horizontal sweep plane, depending on relative tube face dimensions and contours.

Each plate and each insulator alternately spaced across the face of each tube are exactly 1/16 of an inch in width in the embodiment of my device, as set forth herein. Every sixteenth plate of each tube is connected to a conductor 13 which leads through a load resistor 17 to a voltage supply of approximately 10,000 volts direct current. Each lead 13 connecting each sixteenth plate 12 of each tube 10 and 11 is also condenser coupled between load resistor 17 and its respective series of detector plates 12 through a condenser 18 to its respective connection 16′ on a junction box 16. From the corresponding output connections 19 of the junction box 16 a conductor 20 leads to a respective recording head 22. In this manner of connection each recording tube will have sixteen conductors 13 connected to the source 14 of 10,000 volts direct current with load resistors 17 positioned therein; and each will be condenser connected by means of intersecting conductor leads 15 through condensers 18 to their respective connection point 16′ on the junction box 16, thence through the outlet connections 19 of the junction box via conductors 20 to their respective recording heads 22 on the recording bar 21 which are arranged in sequential order in the recording head bar 21. The impulses are conducted from each series of sixteen plates in each tube through its respective conductor lead 13, as detected by the resistors 17 therein between the plates and the source 14 of 10,000 volts direct current supply, through the transverse intersecting conductors 15, load condensers 18, the junction box 16, conductors 20 to the recording heads 22 and are impulsed either electromagnetically or by an embossed process, depending on the types of recording heads employed, on a special tape 23 or other suitable recording medium, such as a series of parallel wires or tapes.

The basic theory on which my device operates is similar to that of any conventional television picture tube insofar as the necessary high voltage and electron beam sweep are concerned. However, two or more recording tubes are used, so that complete program information will be relayed via the detector plates and recording heads to the tape during the broadcast and recording process. Thus, that part of a picture skipped due to an insulator in any tube will be relayed by a detector plate in another of the plurality of recording tubes used in conjunction with each other. Information is fed into the receiver or amplifier, as would be the case in any conventional television receiver. This information is fed directly from the camera which is picking up the program being televised or from a conventional receiver while connected in a parallel circuit arrangement with my invention. The video information is relayed through the common lead 30 to the synchronizedly and parallel connected electron guns 24 within the respective tubes 10 and 11, etc., and is beamed in the conventional manner by an electron beam sweeping the interior surfaces of the tubes to cast its electron bombardment on the alternately spaced insulators and detector plates in the faces thereof. Part of the electron bombardment, which varies as in any conventional receiver in accordance with the impulses fed into the receiver, is cast upon the detector plates 12 of each tube as they are swept by the electron beam. This causes a current flow to be set up in each plate as the beam sweeps it, which current is relayed through the conductors 13 and which is detected through voltage drop or rise by means of the load resistors 17 in each conductor 13 between the respective plates 12 and the source of voltage 14. This variation, as detected by the load resistors 17, is relayed through the conductors 15, condensers 18, the junction box 16 and conductors 20 to the respective recording heads 22, which in turn lay an appropriate responsive pattern, electromagnetically or by embossing, upon the tape 23 as it travels by the recording heads. The alternate spacing of plates 12 in the plurality of detector tubes and the casting simultaneously of identical images upon the inner surfaces of the tube faces together with the sequentially and systematically arranged relay of this information and a synchronizing impulse through the recording heads to the tape results in complete video program information being recorded in an orderly manner on the tape as the electron beams sweep the inner surfaces of the tube faces. The electromagnetic recorder employed in my invention is merely a multiple hook-up of standard recording devices known in that particular art and employs erasing means in conjunction therewith which are also known art in the electromagnetic recording field. This means of recording enables erasing of the tape and re-use when desired. Of course, in the case of using the embossing recording principle the tapes would have to be re-processed in manners known to that field of the tape recording art before re-use would be possible.

By way of an example of the operational theory of my invention assume a frequency response of four million cycles per second; frequency responses as low as one and one-half million cycles per second will generally create a satisfactory picture. In my invention the multiple recording tubes are simultaneously swept by exactly synchronized electron beams from electron guns in each tube. The time required for an electron beam to travel across the face of the tube is a standard 58.5 millionths of a second, and for a detector plate width of 1/16 of an inch in tubes, as contemplated by my invention, the time consumed for the electron beam to sweep one detector plate would be 0.24375 millionth of a second. By using multiple recording heads and by coupling every sixteenth detector plate to a common conductor in each tube, making a total of thirty-two conductors in a complete two-tube setup, it is apparent that there would be thirty-two recording heads and that each such head would record 1/16 of each horizontal sweep of the electron beam. Within the capacity and on the thickness of presently available tapes it is calculated that a tape speed of 93¾ inches per second would enable the complete recording of a one-half hour television program on a reel diameter of slightly less than twenty inches. By increasing the number of recording heads or by reducing the input frequency cycles, or both, a one-half hour program could be recorded on a reel of even smaller diameter.

The audio information is taken from any satisfactory point of the audio circuit incorporated in any manner known to the art, in a conventional receiver or amplifier which is used in conjunction with the recording tubes of my device. The audio information is relayed through appropriate conductors, resistors, condensers, etc., to the audio recording head 34 in the recording head bar 21, and the appropriate pattern therefor is traced on the tape 23 synchronizedly and simultaneously with the video information. A synchronizing impulse, taken from any satisfactory source of the broadcasting camera or receiver set, is also utilized and is traced onto the tape 23 through appropriate conductors, condensers, etc., and recording head 42. The synchronizing impulse insures orderly and chronological re-creation of the recorded information on play-back.

The video information is fed into either the cathode 37 or control grid 36 of the recording tube, see Fig. 6, depending upon the design of the particular receiver or amplifier used in conjunction with the recording tubes of my invention. A six-volt A.C. or D.C. supply conductor 39 enables heating of the filament 38 which in turn heats the cathode 37, thus enabling it to emit or release electrons. In either case of video information being fed into the cathode 37 or the control grid 36 said control grid 36 regulates and determines the amount of electrons that will pass to the accelerating grid 35 and the detector plate 12. A standard type manually operated control would be used in conjunction with either the control grid or cathode in the recording tube in connection with the source of video supply in order to prevent overloading of the recorder. The accelerating grid 35 merely gives the passed electrons an initial impetus toward the detector plates 12 which then tend to draw said electrons to themselves through effect of voltages applied to said plates 12. The amount of electrons passed in any given time interval vary in accordance with the video information which is fed into the cathode or control grid. This variation in passed electrons, as set forth hereinabove, causes a voltage fluctuation across the load resistor 17 which is reflected through the condenser 18 to the recording head 22 which traces the appropriate pattern therefor onto the tape, or series of parallel tapes or wires, 23.

The advantages of my invention for recording of television programs are apparent in that a special tape of sufficient width is employed to accomplish parallel alignment and recording thereon of program data which results in a shortening of the tape length. This in and of itself provides a finished recorded package or reel which is much smaller and more convenient to handle than that now possible by presently used means and methods of recording television programs.

In the case of a glass type tube in an alternate form a high-voltage lead 40 will enter the side of the tube and contact an aquadag area 41 on the inner surface of the tube. In the event of a metal tube being used in an alternate form the aquadag 41 would be eliminated.

In a metal or glass type tube with a high voltage lead which is well known in the television field of art, the suppressor grid 25 would be unnecessary. The aquadag and high voltage lead act as a primary plate to draw the electron beam. The deflection yokes direct the beam across the detector plates 12, which have approximately 500 volts D.C. potential applied. Excess electrons not absorbed by the detector plates 12 are drawn off through the high voltage lead to eliminate any space charge which would ultimately result in defective operation of the tube.

In the case of employing suppressor grids 25 the variable resistor 28 would be utilized to determine the desired resistance to maintain in any given tube. It might also be used for experimental purposes in connection with perfecting recording techniques and results.

Where the suppressor grid is eliminated and the 10,000 voltage direct current applied to the single high-voltage lead emerging in the aquadag on the interior of the tube or connecting to the metal body of a metal tube, a voltage of approximately 500 volts direct current would be applied to the detector plates 12 in the faces of the tubes. Otherwise all parts, and the original design would be exactly the same as hereinabove set forth. In this alternate form the theory of operation would be the same as in the design of tubes set forth hereinabove except that due to the lower voltage applied to the detector plates 12 only a small portion of the electrons emitted from the electron guns 24 are absorbed by the plates 12, the majority being gathered in by the single high-voltage lead. However, enough electrons are absorbed by the detector plates to form a satisfactory image of the original input frequency and to activate the recording heads. The advantage of this design would be the possibility of a smaller, more compact unit.

In playing back the information as recorded by my invention a pickup head corresponding in arrangement with the individual recording heads 22, 34 and 42 of the recording bar 21 may be used, or the recording head bar 21 may be provided with individual recording heads 22, 34 and 42 which are satisfactory for play-back as well as recording purposes. In either case, means will be provided for running the tape or recording medium at the same speed as that employed in the recording operation and also for directing the played back video information into either the cathode or control grid of a receiver set, or into the broadcasting device, through a single or common conductor attached to all of the video play-back heads.

It is apparent that variations of my invention are feasible without departing from the spirit thereof. It is, therefore, to be understood that the disclosures set forth herein are merely preferred embodiments of my invention and that I am not limiting myself to these specific disclosures.

Having thus described my invention, I claim:

1. In equipment for recording television programs the combination of: Two vacuum recording tubes positioned one immediately above and abutting the other at its front edge, each tube having its face arcuately curved at the same radium both horizontally and vertically; a series of vertically curved detector plates of uniform width spaced in vertical and parallel relation on the inner surface of said tube face; a series of uniform insulator ribs integrally formed on the inner surface of each tube face, said insulator ribs alternately spaced between said detector plates and dimensioned to the same width as said detector plates, the insulators in each tube being in exact vertical alignment with the detector plates in the other tube, said arrangement picking up lateral video detail without omissions; a source of video information; an electron gun in each tube, said electron guns synchronizedly connected in parallel to said source of video information; a vertical and horizontal deflection element for each recording tube; fluorescing substance, enabling creation of visual images for monitoring, applied to the back surfaces of said insulator ribs; a plurality of conductors, each connecting a given multiple of said detector plates into a series of said plates, said series of plates numbering to the value of said multiple; a common high-voltage supply connected to said plurality of conductors; a junction box having a plurality of inlet and outlet connections; an intersecting conductor connecting each of the plurality of conductors to an inlet connection on said junction box, each intersecting conductor fastening to one of the plurality of conductors between the series of detector plates and the common high-voltage supply; a load resistor in each of the plurality of conductors between the high-voltage supply and the point of attachment of its intersecting conductor; a condenser in each intersecting conductor between the junction box and each of the plurality of conductors; a source of audio information and a source of synchronizing information connected to said junction box; and recording means consisting of a plurality of recording heads connected to said junction box.

2. In equipment for recording television broadcasts the combination of: A plurality of recording tubes positioned in exact vertical alignment, each tube having its face arcuately curved at the same radius horizontally and having its face perpendicular vertically; a plurality of vertical detector plates of uniform width spaced in parallel relation on the inner surface of each tube face; a plurality of uniformly dimensioned insulator ribs integrally formed on the inner surface of each tube face in spaced parallel relation, said insulator ribs alternately spaced between said detector plates, dimensioned to the same width as said detector plates and positioned in exact vertical alignment with a detector plate in another of the recording tubes, said arrangement enabling the pickup of lateral video detail without omissions; a common source of video information; an electron gun in each recording tube, said electron guns being exactly synchronized and connected in parallel with said common source of video information and adapted to emit electron beams focusable on the detector plates of their respective recording tubes; vertical and horizontal deflection elements adapted to control the electron beams of the electron guns to sweep a single horizontal path simultaneously across the inner faces of each of the recording tubes; a plurality of conductors embedded in the face of each recording tube, each connecting a given multiple of said detector plates into a series of said plates, said series of plates numbering to the value of said multiple in each recording tube; a common, high-voltage supply connected to said plurality of conductors; a junction box having a plurality of inlet and outlet connections; an intersecting conductor connecting each of the plurality of conductors at a point between the detector plates and the common high-voltage supply to an inlet connection on said junction box; a load resistor in each of the plurality of conductors between the common high-voltage supply and the point of attachment of the intersecting conductor; a condenser in each intersecting conductor between the junction box and each of the plurality of conductors; a recording means consisting of a plurality of laterally disposed recording heads; means for transmitting audio information to one of said recording heads; and means for transmitting a synchronizing impulse to one of said recording heads.

3. In equipment for recording television programs: Two vacuum recording tubes positioned one immediately above and abutting the other at its front edge, each tube having its face arcuately curved at the same radius both horizontally and vertically; a series of vertically curved detector plates of uniform width spaced in vertical and parallel relation on the inner surface of each tube face; a series of uniform insulator ribs integrally formed on the inner surface of each tube face, said insulator ribs alternately spaced between said detector plates and dimensioned to the same width as said detector plates, the insulators in each tube being in exact vertical alignment with the detector plates in the other tube, said arrangement picking up lateral video detail without omissions; a source of video information; an electron gun in each tube, said electron guns synchronizedly connected in parallel to said source of video information and directing said video information as an electron beam against the inner surface of the face of their respective recording tubes; fluorescing substance applied to the back surfaces of said insulator ribs, reacting to said electron beam of video information to form an image for monitoring; a suppressor grid within each recording tube conformed to the shape of the face of the tube and positioned between the detector plates and the electron gun; a conductor from ground synchronizedly connecting the suppressor grid in each recording tube in parallel; a variable resistor in said conductor between the suppressor grids and ground; a vertical and horizontal deflection element for each recording tube; a plurality of conductors, each connecting a given multiple of said detector plates into a series of said plates, said series of plates numbering to the value of said multiple; a common voltage supply connected to said plurality of conductors; an intersecting conductor connected to each of the plurality of conductors, each intersecting conductor fastening to one of the plurality of conductors between the series of detector plates and the common voltage supply; a load resistor in each of the plurality of conductors between the voltage supply and the point of attachment of its intersecting conductor; a condenser in each intersecting conductor; recording means connected to said intersecting conductors; means for transmitting audio information to said recording means; means for transmitting a synchronizing impulse to said recording means.

4. In equipment for recording television broadcasts the combination of: A plurality of recording tubes positioned in exact vertical alignment, each tube having its face arcuately curved at the same radius horizontally and having its face perpendicular vertically; a plurality of vertical detector plates of uniform width spaced in parallel relation on the inner surface of each tube face; a plurality of uniformly dimensioned insulator ribs integrally formed on the inner surface of each tube face in spaced parallel relation, said insulator ribs alternately spaced between said detector plates, dimensioned to the same width as said detector plates and positioned in exact vertical alignment with a detector plate in another of the plurality of recording tubes, said arrangement picking up lateral video information without omissions; a common source of video information; an electron gun in each recording tube, said electron guns being exactly synchronized and connected in parallel with said common source of video information and adapted to emit electron beams focusable on the detector plates of their respective recording tubes; a suppressor grid within each recording tube conformed to the shape of the face of the tube and positioned between the detector plates and the electron gun; a conductor from ground synchronizedly connecting the suppressor grid in each recording tube in parallel; a variable resistor in said conductor between the suppressor grids and ground; vertical and horizontal deflection elements adapted to control the electron beams of the electron guns to sweep a single horizontal path simultaneously across the inner faces of each of the recording tubes; a plurality of conductors embedded in the face of each recording tube, each connecting a given multiple of said detector plates into a series of said plates, said series of plates numbering to the value of said multiple in each recording tube; a common voltage supply connected to said plurality of conductors; a junction box having a plurality of inlet and outlet connections; an intersecting conductor connecting each of the plurality of conductors at a point between the detector plates and the common voltage supply to an inlet connection on said junction box; a load resistor in each of the plurality of conductors between the common voltage supply and the point of attachment of the intersecting conductor; a condenser in each intersecting conductor between the junction box and each of the plurality of conductors; a recording means; a source of audio information connected to said recording means; and a source of synchronizing information connected to said recording means.

5. In equipment for recording television broadcasts the combination of: A plurality of recording tubes, each tube having its face arcuately curved at the same radius in one area dimension and perpendicular in the other; a plurality of detector plates of uniform width spaced in parallel relation on the inner surface of each tube face; a plurality of uniformly dimensioned insulator ribs integrally formed on the inner surface of each tube face in spaced parallel relation, said insulator ribs alternately spaced between said detector plates and dimensioned to the same width as said detector plates; a common source of video information; an electron gun in each recording tube, said electron guns being exactly synchronized and connected in parallel with said common source of video information and adapted to emit electron beams focusable on the detector plates of their respective recording tubes; vertical and horizontal deflection elements adapted to control the electron beams of the electron guns to sweep a single path simultaneously across the inner faces of each of the recording tubes; a plurality of conductors embedded in the face of each recording tube, each connecting a given multiple of said detector plates into a series of said plates, said series of plates numbering to the value of said multiple in each recording tube; a common voltage supply connected to said plurality of conductors; a junction box having a plurality of inlet and outlet connections; an intersecting conductor connecting each of the plurality of conductors at a point between the detector plates and the common voltage supply to an inlet connection on said junction box; a load resistor in each of the plurality of conductors between the common voltage supply and the point of attachment of the intersecting conductor; a condenser in each intersecting conductor between the junction box and each of the plurality of conductors; a recording means; and a source of audio information and a source of synchronizing information connected to said recording means.

6. In equipment for recording television programs: A plurality of vacuum recording tubes, each having a plurality of alternately spaced detector plates and integral insulator ribs of uniform width along its inner face surface and each having a plurality of conductors embedded in its face, said conductors connecting multiples of said detector plates in each tube into a series of plates numbering to the value of said multiple, the detector plates in each tube arranged to occupy the position of an insulator rib in one of the other tubes of the plurality of recording tubes, said arrangement picking up beamed video information without omissions of lateral detail.

7. In equipment for recording television programs the combination of: a plurality of vacuum recording tubes connected in parallel to a source of video information, each of said tubes having on its inner face a plurality of alternately spaced detector plates and integral insulator ribs of uniform width, a plurality of conductors embedded in its face, said conductors connecting multiples of said detector plates into a series of plates numbering to the value of said multiple, a fluorescing substance applied to the back surfaces of said insulator ribs adapted to respond to an electron beam of video information to form a monitoring image on the outer face of the tube, each of said detector plates of any one of said plurality of recording tubes positioned in the corresponding position of one of the said insulator ribs in the other tubes of said plurality of recording tubes; and a recording means consisting of a plurality of laterally disposed recording heads connected to said plurality of embedded conductors.

8. In equipment for recording television programs the combination of: a vacuum recording tube having a plurality of alternately spaced detector plates and integral transparent insulator ribs of uniform width along its inner face surface and having a plurality of conductors embedded in its face, said conductors connecting multiples of said detector plates numbering to the value of said multiple; a fluorescing substance applied to the back surface of said insulator ribs, responding to an electron beam of video information and thereby forming a monitoring image on said insulator ribs visible on the face of said tube sequentially with the response of said alternately spaced detector plates to said electron beam of video information; and recording means consisting of a recording bar having a plurality of recording heads disposed thereon, a recording medium and means moving said recording medium relative to said recording heads.

References Cited in the file of this patent

UNITED STATES PATENTS

| | | |
|---|---|---|
| 2,057,773 | Finch | Oct. 20, 1936 |
| 2,472,774 | Mayle | June 7, 1949 |
| 2,517,808 | Sziklai | Aug. 8, 1950 |
| 2,657,377 | Gray | Oct. 27, 1953 |
| 2,698,875 | Greenwood | Jan. 4, 1955 |
| 2,793,288 | Pulvari | May 21, 1957 |